United States Patent [19]

Hursey

[11] Patent Number: 5,074,893
[45] Date of Patent: Dec. 24, 1991

[54] FLUID ADSORPTION SYSTEM

[75] Inventor: Francis X. Hursey, West Hartford, Conn.

[73] Assignee: On Site Gas Systems, Inc., New Britain, Conn.

[21] Appl. No.: 577,505

[22] Filed: Sep. 4, 1990

[51] Int. Cl.⁵ .................................................. B01D 53/04
[52] U.S. Cl. .................................. 55/26; 55/62; 55/68; 55/179; 55/163
[58] Field of Search .................. 55/25, 26, 58, 62, 68, 55/74, 75, 161–163, 179, 387, 389

[56] References Cited

U.S. PATENT DOCUMENTS

| | | | |
|---|---|---|---|
| 3,237,377 | 3/1966 | Skarstrom | 55/58 X |
| 3,564,816 | 2/1971 | Batta | 55/26 |
| 3,636,679 | 10/1972 | Batta | 55/62 X |
| 3,717,974 | 2/1973 | Batta | 55/58 |
| 3,923,477 | 12/1975 | Armond et al. | 55/58 X |
| 4,256,469 | 3/1981 | Leitgeb | 55/25 |
| 4,264,339 | 4/1981 | Jüntgen et al. | 55/25 |
| 4,348,213 | 9/1982 | Armond | 55/25 |
| 4,449,990 | 5/1984 | Tedford, Jr. | 55/26 |
| 4,468,238 | 8/1984 | Matsui et al. | 55/26 |
| 4,494,966 | 1/1985 | Umeki | 55/26 |
| 4,519,813 | 5/1985 | Hagiwara et al. | 55/58 X |
| 4,684,377 | 8/1987 | Haruna et al. | 55/58 X |
| 4,698,075 | 10/1987 | Dechene | 55/179 X |
| 4,725,293 | 2/1988 | Gunderson | 55/163 X |
| 4,756,723 | 7/1988 | Sircar | 55/25 |
| 4,761,165 | 8/1988 | Stöcker et al. | 55/26 X |
| 4,840,647 | 6/1989 | Hay | 55/26 |
| 4,917,710 | 4/1990 | Haruna et al. | 55/26 |

Primary Examiner—Robert Spitzer
Attorney, Agent, or Firm—Chilton, Alix & Van Kirk

[57] ABSTRACT

A fluid adsorption system is provided with a waste saving valve interconnecting companion adsorption beds of the system at the inlets for the adsorption beds. A solenoid control is also provided to control the intermittent actuation of the waste saver valve. The control momentarily interrupts the fluid flow of the feed stream toward the beds and actuates the waste saver valve to provide partial pressurization of the depressurized bed by gas flowing from only the inlet end of the companion bed. The pressure equalization occurs quite rapidly and the control then interconnects the feed stream with the second bed so as to initiate the adsorbing process while simultaneously connecting the first bed to a waste fluid exhaust outlet to provide for discharge of the remaining gases therein and regeneration of the first bed.

15 Claims, 1 Drawing Sheet

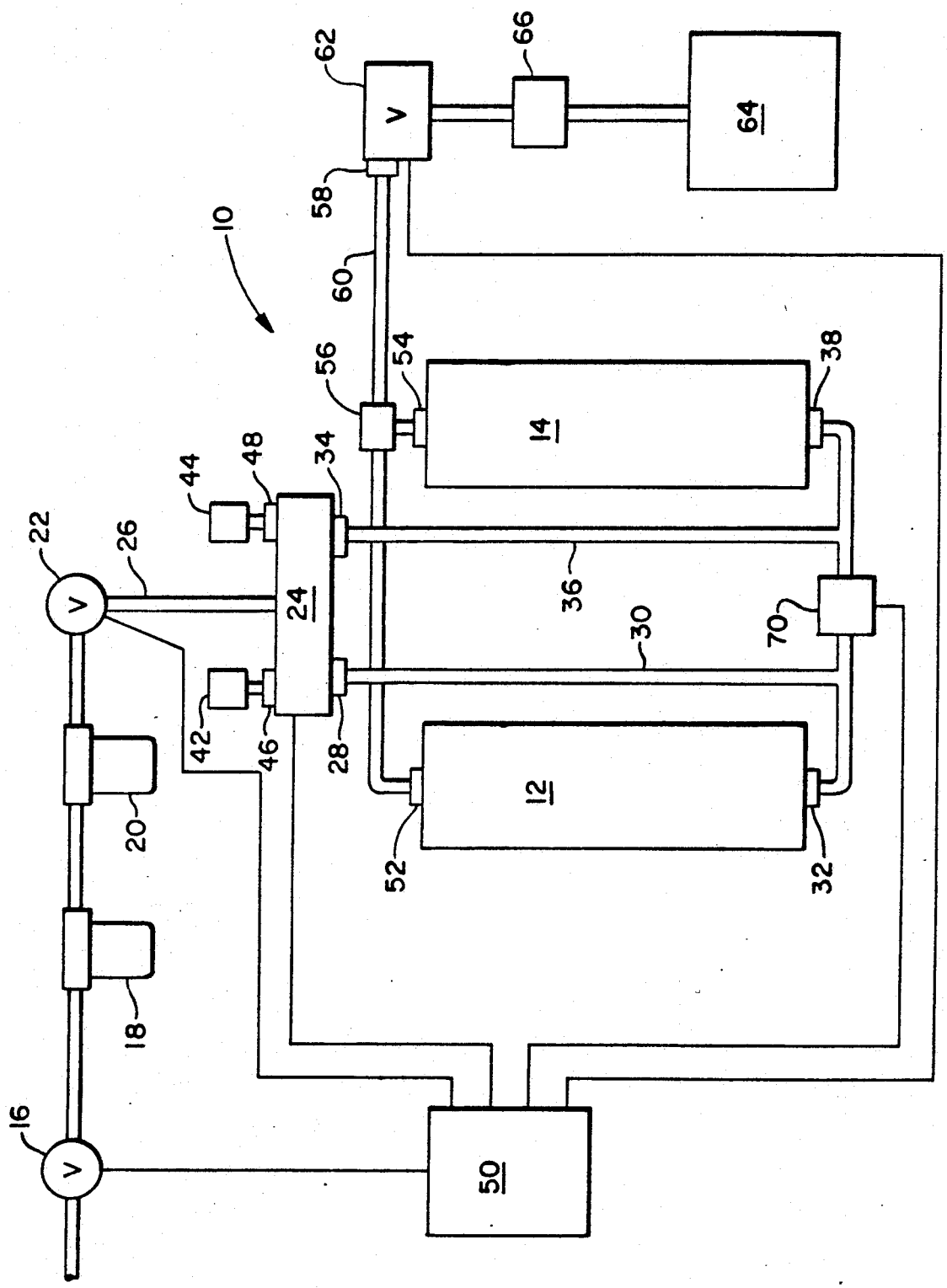

FLUID ADSORPTION SYSTEM

The present invention relates generally to fluid adsorption systems. More particularly it is directed to a new and improved fluid cross-over arrangement for such systems that is effective in significantly reducing the quantity of feed stream gases used in the system.

BACKGROUND AND SUMMARY OF THE INVENTION

Fluid adsorption systems for producing an enriched fluid product are well known. For example, gases such as oxygen or nitrogen can be produced by passing air under pressure through regenerative adsorbing beds that remove one or more of the major gas components therefrom and produce an enriched recovery of a remaining gas component. Examples of such systems are described in U.S. Pat. No. 4,698,075 and the patents cited therein, all of which are incorporated herein by reference.

In such systems a plurality of adsorption beds containing zeolite adsorbent materials are provided. The beds are interconnected by flow control systems so that each bed is operated through repeated cycles, including a pressurized adsorption phase and a depressurized regeneration phase. During the pressurized adsorption phase, air under pressure is supplied to a given bed which, for example, absorbs the nitrogen component of the air passing therethrough so that an oxygen enriched component is produced.

In order to provide continued production, a portion of the enriched gas product from one bed is recirculated through a depressurized companion bed to remove previously adsorbed nitrogen therefrom. This regenerates the depressurized bed for a subsequent pressurized adsorption operation. The regeneration process requires recirculation of only a portion of the beneficiated gas produced by the companion bed and the remaining portion of that gas is removed as a product of the system.

During the regeneration of the bed, the gas present within the bed has been permitted to exhaust to the atmosphere as waste and no attempt has been made to utilize the waste gas within the system.

SUMMARY OF THE INVENTION

In accordance with the present invention a new and improved waste utilization mechanism is provided for the fluid adsorption system by introducing a portion of the pressurized feed stream within the adsorption bed as the initial fluid charge for the depressurized companion bed. The initial depressurization of the first adsorption bed is used as an initial partial pressurization of the companion adsorption bed. This utilization of the back-flow of air tends to lessen the shock of the pressurized feed stream on the adsorption material within the bed, prolonging its integrity and composition. In addition, the utilization of the fluid within the pressurized chamber at the time the feed stream is interrupted and the utilization of that pressurized fluid as the initial charge for the companion bed, provides a saving in the feed stream supply of between 25% to 40%. It will also be appreciated that the pressurized fluid used as an initial charge for the companion adsorption bed is primarily located adjacent the inlet end of the pressurized bed and within an area of the bed where only lower levels of gas are being adsorbed due to saturation of the adsorbent material. Consequently, the initial charge to the companion bed utilizes gas that has not been significantly altered in composition by the initial pressurized adsorption bed. However, to the extent that a preliminary adsorption has occurred, the companion bed receives the benefit from the adsorption that has already occurred. It will also be appreciated that this cross-over arrangement provides only partial depressurization since rapid equalization in the pressure occurs between the two beds. However, even the very brief equilibrating portion of the cycle is adequate t effect significant feed stream savings while only briefly interrupting the feed stream directed toward the adsorption beds.

Other features and advantages will be in part obvious and in part pointed out more in detail hereinafter.

These and related objects and advantages are obtained by providing a fluid adsorption system with a cross-over wastesaving valve arrangement interconnecting companion adsorption beds of the system adjacent the feed stream inlets thereof. Control means are also provided to control the intermittent actuation of the waste saving cross-over arrangement. The control permits fluid interconnection between the beds while momentarily interrupting all fluid flow of the feed stream toward the interconnected beds and all exhaust of the waste fluid. Following the brief interruption and pre-pressurization of the companion adsorption bed, the feed stream is directed to the companion bed, while the previously used, partially depressurized adsorption bed is fully exhausted and regenerated.

A better understanding of the objects, advantages, features, properties and relationships of the invention will be obtained from the following detailed description of the apparatus shown herein and the several steps and the relationship of one or more of such steps with respect to each of the others. The apparatus shown in the accompanying drawing sets forth an illustrative embodiment that is indicative of the way in which the principles of the invention are employed.

BRIEF DESCRIPTION OF THE DRAWING

The drawing is a schematic view of a two bed adsorption system for producing oxygen and incorporates the waste saving crossover arrangement of the present invention.

DETAILED DESCRIPTION OF THE DRAWING

Referring now to the drawing in greater detail, the adsorption system 10 of the present invention is illustrated as including first and second beds 12, 14 of similar size filled with a suitable adsorption material, such as zeolite, known to those skilled in the art. The material operates under pressure to adsorb one component, such as nitrogen, of compressed air passing therethrough. Alternatively, a system utilizing three or more beds could be employed, or the sieve material could be such as to adsorb oxygen and allow the nitrogen to pass through as the enriched gaseous product.

Compressed air from a compressor or other source, not shown, is supplied through an appropriate inlet valve 16 that can conveniently be closed when the system is shut down. During normal operation of the system the inlet valve 16 is fully open to permit the feed stream to flow therethrough toward the beds 12, 14. The air typically is first passed through one or more traps or filters 18, 20 to clean and dry the feed stream. The compressed feed steam flows from the filters to a pressure regulator 22 that preferably is set to the desired supply pressure for the system. Down stream of the pressure regulator 22 there is provided a four-way, solenoid-operated, fluid control valve 24 connected to the regulator by a feed stream inlet line 26. A first controlled port 28 of the four-way valve is connected through a pressure line 30 to the inlet end 32 of the first bed 12 while a second controlled port 34 is connected through a separate pressure line 36 to the inlet end 38 of the second adsorption bed 14. First and second exhaust mufflers 42, 44 are connected to first and second exhaust ports 46, 48 of the four-way controlled valve 24.

The control valve functions in a first position to interrupt all flow of the feed stream from the inlet line 26 to either adsorption bed. In a second position the valve 24 connects the lower inlet end 32 of the first bed 12 to the supply of compressed air in the feed stream and simultaneously connects the lower end 38 of the second bed 14 to the second exhaust muffler 44. When the valve 24 is shifted to its third operating position, the connections are reversed and the supply air under pressure in the inlet line 26 is connected to the lower inlet end 38 of the second adsorption bed 14 while the lower end 32 of the first adsorption bed 12 is connected to its associated first exhaust muffler 42. The operation of the four-way valve 24, which is controlled in a conventional manner by a suitable control unit 50, results in the pressurization of one bed while the other bed is open to the atmosphere and exhausted. The reversed condition permits depressurization of the first bed 12 via its connection to the exhaust muffler 42 while the second bed 14 is fully pressurized.

The upper or outlet ends 52, 54 of the respective adsorption beds 12, 14 are connected to a flow divider system 56 of conventional design. A single fixed orifice 58 is connected to the pressure line 60 downstream of the flow divider and may be mounted, as shown, on the inlet of a pressure regulating, solenoid actuated valve 62. From the solenoid valve 62 the oxygen produced by the system flows to a storage container 64. A pressure gauge (not shown) may be provided to indicate the discharge pressure of the oxygen produced by the system and a pressure switch 66 also may be employed to sense such discharge pressure. The storage tank 64 is provided to allow the accumulation of a supply of oxygen under pressure which is subsequently used in any desired manner.

In accordance with the present invention, a waste saving cross-over valve 70 is connected to the inlet lines 30, 36 of the adsorbent beds 12, 14. The cross-over valve 70 is positioned between the control valve 24 and the inlet ends 32, 38 of the beds. The waste saving cross-over valve 70 is a simple two-way valve operable between an open and a closed position and, when in an open position, will provide direct communication between the inlet ends 32, 38 of the companion adsorption beds. The cross-over valve 70 is closed during normal operation of the system and its operation is controlled in synchronism with the control valve 24 by the control unit 50.

As is known, the system typically operates through brief repeated cycles. Clean, dry air under pressure is alternatively supplied to the different beds, one being pressurized while the other bed is depressurized and regenerated. The supply of air in the feed stream reaching the regulator 22 is adjusted to the desired system supply pressure which may be, for example, about 65 pounds per square inch. The four-way control valve 24 is cycled back and forth by an appropriate mechanical or electric control unit such as a timer or other suitable control, designated generally by the numeral 50. During the first half of the full cycle, the four-way control valve 24 is moved to an operative position in which the supply of air from the regulator 22 is connected through the pressure line 30 to the first adsorption bed 12. During this phase of the cycle, the second adsorption bed 14 is in communication with the exhaust muffler 44 through the pressure line 36. During the adsorption/regeneration phase of the cycle the cross-over valve 70 is closed.

The compressed air flowing up through the adsorption bed 12 causes the zeolite contained within the bed to absorb the nitrogen component of the air so that the oxygen component reaching the upper end 52 of the bed has a purity of about 90–95%. It will, of course, be appreciated that within the broader aspect of this invention, the system can be used to separate other components of a compressed feed stream passing through adsorption beds containing other types of adsorption material. The invention is not limited to the production of oxygen. For example, the reverse arrangement may be desired such that oxygen may be adsorbed in a similar system with the appropriate zeolite to produce nitrogen as the fluid product.

As the first phase of the cycle is initiated and the compressed air is supplied to the lower end of the first bed 12, the pressure within the bed increases and the pressure of the fluid product flowing from the upper outlet end 52 of the bed to the divider 56 gradually increases. The second bed 14 is in direct communication with its exhaust muffler 44 and therefore the pressure therein is substantially atmospheric pressure. As the differential in pressure between the beds increases, the flow of fluid product through restrictors in the divider 56 increases as a function of the differential pressures across the restrictor and a portion of the fluid product passes through the depressurized second bed 14 to regenerate the zeolite therein.

At the end of the first phase of the operating cycle, the control unit 50 initially shifts the four-way control valve 24 to its closed position to interrupt the flow of compressed air to the first adsorption bed 12 and terminate the exhaust of the second bed 14 to the exhaust muffler 44. Simultaneously, the control unit 50 actuates the waste-saving solenoid valve 70 to move the valve to an open position so as to provide full communication between the pressurized first bed 12 and the depressurized regenerated second bed 14. The air then within the lower portion of the first bed 12 has passed over that portion of the zeolite that has adsorbed the most nitrogen and therefore is relatively unaffected by the zeolite. As the waste-saving solenoid valve 70 is actuated, the high pressure within the first bed 12 will immediately cause a back flow through the inlet conduit 30 of the first bed 12 through the valve 70 toward the inlet 38 of the second bed 14 so as to tend to equalize the pressure within both of the companion adsorption beds. This will result in an immediate partial depressurization of the first bed 12 and a corresponding partial pressurization of the complimentary second bed 14. The partial pressurization of the second bed 14 is caused by the air occupying at least the lower portion of the first bed 12, thereby causing partial pressurization of the second bed 14 without loss of any fluid within the feed stream. The waste-saving cross-over valve 70 is maintained in its opened position for only a brief period of time, about 1/10th that of the adsorption phase, for example, about 5–6 seconds, whereupon the valve 70 is closed by the control unit 50 and the four-way control valve 24 is shifted to connect the compressed air supply in line 26 to the second adsorption bed 14 through the pressure line 36, while simultaneously connecting the lower end 32 of the first bed 12 to its associated exhaust muffler 42 causing full depressurization of the first bed 12. During this phase of the total cycle, the nitrogen component of the compressed air is adsorbed in the second bed 14 and a relatively pure oxygen component, or fluid product, is delivered to the flow divider 56 from the outlet end 54 of bed 14. The pressure build up occurs in the pressure line leading to bed 14 while a corresponding decrease in pressure occurs in the pressure line between bed 12 and divider 56 due to the decompression of the first adsorption bed 12. This causes a reverse flow in the differential pressure across the flow divider 56 and a portion of the fluid product commences to flow through the first adsorption bed 12 to regenerate that bed while the second adsorption bed 14 is pressurized and is producing the oxygen product.

Because the second adsorption bed is partially pressurized during the actuation of the waste saving valve 70, the full force of the pressurized feed stream does not immediately impact on the adsorption material within the second bed. Additionally, the compressed air that had proceeded through the four-way control valve 24 into the lower section of the first adsorption bed has been utilized to prepressurize the second adsorption bed, thereby fully utilizing a major portion of the pressurized feed stream prior to connecting the first bed to its exhaust muffler. As mentioned, this provides an effective savings of between 25% to 40% of the feed stream gas during each two minute oxygen producing cycle.

While the preferred embodiment of the invention has been set forth for purposes of illustration, it will be apparent to persons skilled in the art that various modifications, adaptations and variations of foregoing specific disclosure can be made without departing from the spirit and scope of the teachings of the present invention.

I claim:

1. In a method of providing fluid separation in an cyclical multi-bed adsorption system comprising the steps of introducing a pressurized feed stream into an adsorption zone of one bed while providing depressurized regeneration of a companion bed, the improvement comprising interrupting the flow of said feed stream into said one bed and the regeneration of said companion bed, partially pressurizing said companion bed using pressurized fluid flowing from only the inlet end of said first bed and subsequently introducing said pressurized feed stream into said second bed.

2. The method of claim 1 wherein the fluid from said first bed used to partially pressurize said companion bed is taken from the upstream portion of said first adsorption bed.

3. The method of claim 1 wherein said partial pressurization is achieved by providing brief intercommunication between the inlet ends of said beds.

4. The method of claim 3 wherein said brief intercommunication is for a period significantly less than the period during which the feed stream flows into said first bed.

5. The method of claim 3 wherein said intercommunication period is about one tenth of a two minute adsorption cycle.

6. The method of claim 1 including the step of providing limited fluid flow from the outlet end of the pressurized bed into the outlet end of the depressurized bed during flow of the feed stream into the pressurized bed to assist in regenerating the depressurized bed.

7. In a fluid adsorption system comprising regenerative separation beds having fluid inlets for alternately receiving a feed stream, said beds being cyclically operable to effect pressurized separation of said feed stream passing therethrough, waste fluid outlet means connected to said beds for discharge of waste fluid during regeneration of said beds and primary valving means for directing the flow of the feed stream toward one of said separation beds and directing the flow of waste fluid away from another of said separation beds toward said waste fluid outlet means, the combination comprising waste saving means interconnecting said beds adjacent said fluid inlets, and control means for providing intermittent actuation of said waste savings means to permit fluid interconnection between said fluid inlets of said beds while interrupting the flow of said feed stream toward said beds whereby only fluid at the inlet end of the pressurized bed flows into the regenerated bed to prevent loss of said feed stream while partially pressurizing said regenerated bed and for providing subsequent actuation of said primary valving means for directing the flow of waste fluid from said separation bed toward said waste fluid outlet means.

8. The system of claim 7 where said waste saving means includes valve means for controlling direct fluid flow between only the inlets of said beds.

9. The system of claim 8 wherein the valve means is intermittently operative to provide pressurized fluid flow between only the inlets of said beds.

10. The system of claim 7 wherein said waste saving means includes a fluid flow actuator and said control means includes timing means for activating said actuator.

11. The system of claim 10 wherein said actuator is an electrically activated actuator.

12. The system of claim 10 wherein said actuator is a solenoid actuator.

13. The system of claim 7 wherein said control means is effective for controlling the operation of said primary valving means for momentarily terminating all fluid flow through said primary valving means and simultaneously actuating said waste saving means for providing direct fluid communication between only the fluid inlets of said separation beds to effect partial pressurization of said beds.

14. The system of claim 13 wherein said primary valving means and said waste saving means are solenoid actuated.

15. The system of claim 7 including flow divider means at the outlets of said beds for sensing the pressure differential between said beds and permitting limited flow into the depressurized bed for regeneration thereof.

* * * * *